United States Patent Office — 3,637,800 — Patented Jan. 25, 1972

3,637,800
POLYCHLORO- OR BROMOMUCONONITRILE
Dennis Ernest Burton, Saffron Walden, England, assignor to Fisons Pest Control Limited, Harston-Cambridgeshire, England
No Drawing. Filed Jan. 22, 1968, Ser. No. 699,305
Claims priority, application Great Britain, Jan. 26, 1967, 3,912/67
Int. Cl. C07c 121/30
U.S. Cl. 260—465.7    4 Claims

ABSTRACT OF THE DISCLOSURE

Compounds of the formula

NC—CR$^1$=CR$^2$—CR$^3$=CR$^4$—CN wherein R$^1$, R$^2$, R$^3$, and R$^4$ are identical or different and represent hydrogen, bromine or chlorine provided that no more than one of the said groups is hydrogen. The compounds are active pesticides and are useful as fungicides, bactericides, insecticides and herbicides, and particularly as seed dressings, soil fungicides, etc.

---

The present invention relates to improved pesticidal compositions and to new compounds possessing pesticidal activity.

It has been found that the mucononitriles hereinafter referred to are active pesticides and are useful as fungicides, bactericides, insecticides and herbicides. In this specification the term pesticide and pesticidal is to be understood as describing compounds or compositions which may be used to control any undesired or noxious organisms, including but not limited to plants, animals, insects and micro-organisms.

Accordingly, the present invention is for a pesticidal composition which contains as an active ingredient a mucononitrile of the formula:

NC—CR$^1$=CR$^2$—CR$^3$=CR$^4$—CN where R$^1$, R$^2$, R$^3$ and R$^4$ may be the same or different and represent hydrogen, halogen (for example chlorine, bromine, iodine or fluorine), alkyl (for example of 1–5 carbon atoms such as methyl or ethyl), substituted alkyl (for example of 1–5 carbon atoms substituted by halogen or alkoxy such as chloromethyl or ethoxyethyl) or alkoxy (for example of 1–5 carbon atoms such as methoxy or ethoxy). The pesticidal composition suitably also contains at least one material selected from the group comprising inert carriers, solid diluents, wetting agents and high boiling solvents or oils.

The present invention is also for the treatment of plants, the soil, land or aquatic areas or materials which comprises applying thereon or thereto a mucononitrile as identified above.

The present invention is also for the new mucononitriles of the formula

NC—CR$^1$=CR$^2$—CR$^3$=CR$^4$—CN where R$^1$, R$^2$, R$^3$ and R$^4$ are as defined above, provided that not more than one of the groups R$^1$, R$^2$, R$^3$ and R$^4$ is hydrogen.

The mucononitriles are suitably prepared by the oxidation of the corresponding ortho-phenylene diamine; this oxidation is suitably effected with lead tetra-acetate, yielding the cis,cis isomers.

The mucononitriles are of particular value as fungicides; they may also be used as bactericides, insecticides and herbicides. The mucononitriles find particular application as soil fungicides and as seed dressings.

The mucononitriles are generally insoluble, or of low solubility, in water, and may be formulated in any of the ways commonly used for compounds of low solubility.

If desired the mucononitrile may be dissolved or dispersed in a water immiscible solvent, such as for example a high boiling hydrocarbon or oil suitably containing dissolved emulsifying agents so as to act as a self-emulsifiable oil on addition to water.

The mucononitrile may also be admixed with a wetting agent with or without an inert diluent to form a wettable powder which is soluble or dispersible in water, or may be mixed with an inert diluent to form a solid or powdery product, with or without an oil.

Inert diluents with which the mucononitrile may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, octadecyl sodium sulphate and cetyl sodium sulphate, fatty aromatic sulphonates such as alkyl-benzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example, condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

The pesticide compositions according to the present invention may contain in addition to the mucononitriles other active materials, such as fungicides, insecticides, bactericides and herbicides. It has been found that particular advantages are obtained with mixtures with other fungicides.

The following examples are given to illustrate the present invention. The parts and percentages are by weight unless otherwise indicated.

EXAMPLE 1

A suspension of 3,4,5,6-tetrachloro-o-phenylenediamine (49.2 parts) in anhydrous benzene (225 parts) was added slowly to freshly prepared lead tetraacetate (180 parts) stirred in anhydrous benzene (1600 parts) at 60° C. Heating was continued for a further two hours and the mixture filtered. The filtrate was added to stirred 20% sodium bicarbonate solution (500 parts) and refiltered. The organic layer was separated and washed with water and then dried. Removal of the solvent gave a solid which was digested with hot petroleum spirit (boiling point 40–60° C.). The extract was treated with charcoal and concentrated until crystallisation occurred. The product, 2,3,4,5-tetrachloromucononitrile (27.2 parts, 56% yield) was obtained as pale yellow prisms, melting point 96–98° C.

Analysis.—Found (percent): C, 30.00; Cl, 58.55; N, 11.25. C$_6$Cl$_4$N$_2$ requires (percent): C, 29.79; Cl, 58.63; N, 11.58.

EXAMPLES 2–16

By processes analogous to that of Example 1, the following substituted mucononitriles were prepared by lead tetraacetate oxidation of the corresponding ortho-phenylenediamines.

(2) 2,3-dichloromucononitriles, colourless needles, melting point 41–42° C. (13% yield)

*Analysis.*—Found (percent): C, 41.80; H, 1.20; Cl, 41.15; N, 16.15. $C_6H_2Cl_2N_2$ requires (percent): C, 41.65; H, 1.16; Cl, 40.99; N, 16.20.

(3) 2,3,4-trichloromucononitrile, colourless needles, melting point 42–44° C. (49% yield)

*Analysis.*—Found (percent): C, 34.75; H, 0.50; Cl, 51.25. $C_6HCl_3N_2$ requires (percent): C, 34.95; H, 0.70; Cl, 51.05.

(4) 2,3,5-trichloromuconotrile, yellow crystals, melting point 77–78° C. (75% yield)

*Analysis.*—Found (percent): C, 35.15; H, 1.00; Cl, 50.25; N, 13.65. $C_6HCl_3N_2$ requires (percent): C, 34.95; H, 0.70; Cl, 51.05; N, 13.30.

(5) 2,4-dichloromucononitrile, colourless needles, melting point 60–61.5° C. (41% yield)

*Analysis.*—Found (percent): C, 41.50; H, 1.00; Cl, 41.00; N, 16.15. $C_6H_2Cl_2N_2$ requires (percent): C, 41.65; H, 1.16; Cl, 40.99; N, 16.20.

(6) 2,5-dichloromucononitrile, off-white needles, melting point 161–163° C. (40% yield)

*Analysis.*—Found (percent): C, 41.80; H, 1.40; Cl, 41.10; N. 16.25. $C_6H_2Cl_2N_2$ requires (percent): C, 41.65; H. 1.16; Cl, 40.99; N, 16.20.

(7) 3,4-dichloromucononitrile, pale yellow needles, melting point 51–53° C. (21% yield)

*Aanalysis.*—Found (percent): C, 41.55; H, 1.25; Cl, 40.95; N, 16.25. $C_6H_2Cl_2N_2$ requires (percent): C, 41.65; H, 1.16; Cl, 40.99; N, 16.20.

(8) 2,4-dibromomucononitrile, pale cream needles, melting point 73–74° C. (39% yield)

*Analysis.*—Found (percent): C, 27.80; H, 0.80; Br, 60.85; N, 10.75. $C_6H_2Br_2N_2$ requires (percent): C, 27.51; H, 0.77; Br. 61.02; N, 10.70.

(9) 3-tert-butylmucononitrile, colourless needles, melting point 77–78.5° C. (38% yield)

*Analysis.*—Found (percent): C, 75.00; H, 7.75; N, 17.65. $C_{10}H_{12}N_2$ requires (percent): C, 74.96; H, 7.55; N, 17.49.

(10) 2,3,5-trichloro - 4 - methylmucononitrile, off-white needles, melting point 111–113° C. (63% yield)

*Analysis.*—Found (percent): C, 38.15; H, 1.10; N, 12.60. $C_7H_3Cl_3N_2$ requires (percent): C, 37.95; H, 1.37; N, 12.65.

(11) 2,5-dichloro-3-methylmucononitrile, yellow crystalline solid, melting point 56–57° C. (48% yield)

*Analysis.*—Found (percent): C, 44.70; H, 2.30, N, 14.95. $C_7H_4Cl_2N_2$ requires (percent): C, 44.95; H, 2.16; N, 14.98.

(12) 2,4-dichloro - 3 - methylmucononitrile, pale brown needles, melting point 44–45° C. (32% yield)

*Analysis.*—Found (percent): C, 45.00; H, 1.80; N, 15.10. $C_7H_4Cl_2N_2$ requires (percent): C, 44.95; H, 2.16; N, 14.98.

(13) 2,3,4-tribromomucononitrile, pale yellow needles, melting point 68–69° C. (59% yield)

*Analysis.*—Found (percent): C, 20.90; H, 0.30; N, 7.95. $C_6HBr_3N_2$ requires (percent): C, 21.14; H, 0.30; N, 8.22.

(14) 2-bromo - 4 - chloromucononitrile, yellow needles, melting point 70–72° C. (28% yield)

*Analysis.*—Found (percent): C, 33.20; H, 0.80; N, 12.85. $C_6H_2BrClN_2$ requires (percent): C, 33.13; H, 0.93; N, 12.88.

(15) 2-bromo-3,4,5-trichloromucononitrile, light brown crystals, melting point 97–99° C. (70% yield)

*Analysis.*—Found (percent): C, 25.05; Br, 27.70; Cl, 37.10. $C_6BrCl_3N_2$ requires (percent): C, 25.16; Br, 27.90; Cl, 37.15.

(16) 3-bromo-2,4,5-trichloromucononitrile, melting point 92–94° C. (42% yield)

*Aanalysis.*—Found (percent): C, 25.45; N, 9.60. $C_6BrCl_3N_2$ requires (percent): C, 25.16; N, 9.79.

EXAMPLES 17–24

The compounds 2,3-dichloromucononitrile, 2,4-dichloromucononitrile, 2,5-dichloromucononitrile, 3,4-dichloromucononitrile, 2,3,4-trichloromucononitrile, 2,3,5-trichloromucononitrile, 2,3,4,5-tetrachloromucononitrile and 2,4-dibromomucononitrile were each incorporated into the nutrient medium known as potato dextrose agar in the molten state at a concentration of 10 parts per million. The liquids were poured into petri dishes and, when cool, the culture plates were inoculated with mycelial plugs of the following eight fungal species.

*Phytophthora palmivora*
*Rhizoctonia solani*
*Fusarium oxysporum* f. *cubense*
*Verticillium albo-atrum*
*Lenzites trabae*
*Aspergillus niger*
*Cladosporium herbarum*
*Penicillium digitatum*

The place were cultured at 20° C. for 7 days and then the amount of fungal growth was measured in comparison with control experiments carried out without the chemical. It was found that in all cases the compounds had inhibited the growth of the fungi by at least 95%.

EXAMPLES 25–30

A 1% solution of each of the compounds 2,3-dichloromucononitrile, 2,4-dichloromucononitrile, 3,4 - dichloromucononitrile, 2,3,4 - trichloromucononitrile, 2,3,5-trichloromucononitrile and 2,4 - dibromomuconanitrile in polyethylene glycol (the commercial product Carbowax 400) was diluted with 2% dextrose nutrient broth, to give concentrations of 1000, 200, 40 and 8 parts per million (p.p.m.) of the compounds. Samples at these concentrations were then inoculated with suspensions of the bacteria *Xanthomonas malvacearum* and *Corynebacter michiganense* and the cultures then incubated for eight days at 25° C. At the end of this period the bacteriostatic activity of each compound was assessed by visual inspection of the bacterial growth. To measure the bactericidal activity, 24 hours after inoculation a loopful of broth was transferred from each sample into 5 millilitres of untreated medium and incubated for seven days at 25° C. after which the bacterial development was assessed.

It was found that 2,3-dichloromucononitrile, 2,4-dichloromucononitrile, 3,4-dichloromucononitrile and 2,3 5-trichloromucononitrile were bacteriostatic and bactericidal to both organisms at concentrations down to 8 p.p.m. and that 2,3,4-trichloromucononitrile and 2,4-dibromomucononitrile were bacteriostatic to both organisms at concentrations down to 8 p.p.m. and bactericidal to both organisms at concentrations down to 40 p.p.m.

EXAMPLES 31–37

Filter papers were treated with acetone solutions of mucononitrile derivatives listed below at such a rate as to leave deposits of the mucononitrile derivatives of 30, 10 and 3 milligrams per square foot (mg./ft.$^2$) (mg./0.09 m.$^2$). When the acetone had evaporated off, the papers were placed in petri dishes into which lightly anaesthetised female adult houseflies (*Musca domestica*) were introduced. After 24 hours the percentage mortality at each concentration was noted and the $LD_{50}$ calculated. Results are tabulated below:

| Example No. | Compound | $LD_{50}$ mg./ft.² (mg./0.09 m.²) |
|---|---|---|
| 31 | 2,3-dichloromucononitrile | 3.0 |
| 32 | 2,4-dichloromucononitrile | 3.0 |
| 33 | 3,4-dichloromucononitrile | 5.5 |
| 34 | 2,3,4-trichloromucononitrile | 3.0 |
| 35 | 2,3,5-trichloromucononitrile | 5.5 |
| 36 | 2,3,4,5-tetrachloromucononitrile | 5.5 |
| 37 | 2,4-dibromomucononitrile | 17 |

EXAMPLES 38-44

Glass petri dishes were sprayed with acetone solutions of mucononitrile derivatives listed below at such a rate as to leave deposits of the mucononitrile derivatives of 10, 3, 1 and 0.1 milligrams per square foot (per 0.09 m.²). After 24 hours, lightly anaesthetised female adult mosquitoes (*Aedes aegypti*) were introduced into petri dishes. After a further 24 hours the percentage mortality at each concentration was noted and the $LD_{50}$ calculated.

Results are tabulated below:

| Example No. | Compound | $LD_{50}$ mg./ft.² (mg./0.09 m.²) |
|---|---|---|
| 38 | 3-tert-butylmucononitrile | 2.3 |
| 39 | 2,3-dichloromucononitrile | 0.15 |
| 40 | 2,4-dichloromucononitrile | 0.5 |
| 41 | 3,4-dichloromucononitrile | 0.39 |
| 42 | 2,3,4-trichloromucononitrile | 1.75 |
| 43 | 2,3,5-trichloromucononitrile | 0.5 |
| 44 | 2,4-dibromomucononitrile | 0.33 |

EXAMPLE 45

A soil composition made up of 2 parts sand, 1 part loam and John Innes base fertilizer was artificially infested with root-knot eelworms, Meloidogyne sp., by adding and mixing in thoroughly finely chopped infested tomoto roots. The soil was then treated with a solution of 2,3,5 - trichloromucononitrile at rates equivalent to 62.5 and 31.25 parts per million (wt. of active ingredient per volume of soil) and thoroughly mixed in a plastic bag. After five days incubation at 28° C. in a sealed glass jar the soil was transferred to 3″ (7.6 cm.) diameter pots—three replications of each concentration together with three control pots of untreated infested soil and three pots treated with the standard nematocide DD—(dichloropropylene and dichloropropane mixture) at 125 pp.m.

Young tomato seedlings were then planted in the pots and the plants grown for a further 14 days at 28° C. After this time the plants were removed from the pots and then washed and assessed for nematode attack. The assessment was based on a 0-4 scale where 0=no attack and 4=plant roots were severely damaged. The results are shown in the following table:

| Compound | Rate, p.p.m. | Root-knot assessment |
|---|---|---|
| 2,3,5-trichloromucononitrile | 62.5 | 0.3 |
|  | 31.25 | 2.3 |
| DD | 125 | 0.5 |
| Control |  | 4.0 |

EXAMPLE 46

Peas (*Pisum sativum*), mustard (*Sinapis alba*), linseed (*Linum usitatissimum*), sugarbeet (*Beta vulgaris*), oat (*Avena sativa*) and ryegrass (*Lolium sp.*) were grown in aluminium pans (7½″ x 3¾″ x 2″) (19 x 9.5 x 5 cm.) containing John Innes potting compost—two species per pan. When the plants were 2-3″ (5-7.5 cm.) high and the first true leaves were fully expanded they were sprayed with an acetone/water suspension of 2,3,5-trichloromucononitrile at a rate equivalent to 10, 5 and 2½ lbs. per acre (11.2, 5.6 and 2.8 kg. per hectare) in 80 gallons (360 litres).

After 7 days growth under controlled environment conditions—22° C. with 14 hours illumination at 1,200 ft. candles (129,120 lux)—the activity of the compound against the plants was assessed on a 0-100 score where 0=no damage and 100=complete kill.

| Compound | Rate | | Peas | Mustard | Linseed | Sugar beet | Oats | Ryegrass |
|---|---|---|---|---|---|---|---|---|
|  | Lbs./acre | Kg./ha. | | | | | | |
| 2,3,5-trichloromucononitrile | 10 | 11.2 | 15 | 98 | 100 | 98 | 20 | 80 |
|  | 5 | 5.6 | 10 | 80 | 90 | 50 | 5 | 12 |
|  | 2.5 | 2.8 | 3 | 30 | 65 | 45 | 3 | 10 |

EXAMPLE 47

A formulation suitable for seed dressing was prepared as follows:

| | Percent |
|---|---|
| 2,3,5-trichloromucononitrile | 25 |
| Risella oil | 1 |
| Attaclay | 74 |

This seed dressing was mixed with barley at a rate of 2% by weight (i.e. 0.5% by weight active ingredient), and was found to give complete protection from fungal attack.

In the general use of the mucononitriles as fungicides, these may be applied to plants in any of the convention ways viz by dusting, spraying with aqueous dispersions etc. at rates of the order of 0.5-2 lbs. per acre. The extent of dilution of the mucononitrile in the composition applied to the plants does not seem in any way critical and may vary for example from 5-50% by weight and is suitably about 25% by weight.

For use in seed dressings the mucononitriles are preferably mixed with an inert diluent e.g. a clay, since this facilitates the admixture with the seed. The mucononitriles are suitably applied to the seed at a rate of 0.05 to 1% and preferably about 0.2% by weight. The dilution of the mucononitrile in the composition used for seed dressing is not critical, and is suitably about 10-50%, and preferably about 25%, by weight. Seeds which are usefully treated in this way include wheat, oats, barley, maize, rice, cotton, peas and beans.

In seed dressings it may be advantageous to include other fungicides such as zineb, maneb, thiuram and captan.

For use as a soil fungicide, the mucononitrile is suitably mixed with the soil in the form of a solution or dispersion at a rate of 10-500, and preferably about 150, parts per million. These rates are calculated in respect of the top 6 inches (15.24 cm.) of soil. At the higher rates of application the mucononitriles act as general soil sterilants.

As used in the specification and claims the term pesticidal composition includes compositions for the treatment of pests and noxious organisms of all kinds including but not restricted to fungal, insect, nematode, acari, bacterial and other pests.

I claim:

1. A mucononitrile compound of the formula:

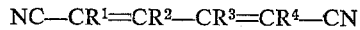

$$NC-CR^1=CR^2-CR^3=CR^4-CN$$

wherein $R^1$, $R^2$, $R^3$, and $R^4$ are the same or different and are selected from hydrogen, chlorine and bromine provided that not more than one of the groups $R^1$, $R^2$, $R^3$, and $R^4$ represents hydrogen.

2. A compound according to claim 1 namely 2,3,4,5-tetrachloromucononitrile.

3. A compound according to claim 1 namely 2,3,4-trichloromucononitrile.

4. A compound according to claim 1 namely 2,3,5-trichloromucononitrile.

References Cited

UNITED STATES PATENTS

| | | | |
|---|---|---|---|
| 2,356,075 | 8/1944 | Migrdichian | 260—465.7 X |
| 2,416,004 | 2/1947 | Hall | 424—304 |
| 2,433,742 | 12/1947 | Davis | 424—304 |
| 3,417,130 | 12/1968 | Pruett et al. | 260—465.3 |

OTHER REFERENCES

Nakagawa et al., C.A., p. 16257b (1965), vol. 63.

Elvidge, et al., C.A. 47, p. 1058 (1953).

JOSEPH PAUL BRUST, Primary Examiner

U.S. Cl. X.R.

71—105; 260—465.6, 465.8; 424—304